United States Patent [19]

Brown

[11] 3,993,164
[45] Nov. 23, 1976

[54] MOUNTING AND LUBRICATING SYSTEM FOR ROTATING MACHINERY

[76] Inventor: Kenard D. Brown, 1227 S. Willow St., Casper, Wyo. 82601

[22] Filed: Aug. 12, 1974

[21] Appl. No.: 496,818

Related U.S. Application Data

[60] Continuation-in-part of Ser. No. 472,651, May 23, 1974, abandoned, which is a division of Ser. No. 231,148, March 21, 1972, Pat. No. 3,812,654.

[52] U.S. Cl. .................................. 184/6; 308/9; 308/122; 415/110
[51] Int. Cl.² .................................. F16C 17/16
[58] Field of Search .................. 184/6, 6.18, 122; 308/9, 122; 55/84, 86, 89, 90, 92–95, 224, 233–234, 244; 110/8; 415/60, 110; 210/402

[56] References Cited
UNITED STATES PATENTS

| | | | |
|---|---|---|---|
| 2,819,798 | 1/1958 | Carter | 210/402 |
| 2,824,521 | 2/1958 | Birkigt | 184/6.18 |
| 3,176,403 | 4/1965 | Meyer | 308/9 |
| 3,193,054 | 7/1965 | Flaherty | 308/9 |
| 3,687,233 | 8/1972 | Greenwald | 184/6.18 |
| 3,806,208 | 4/1974 | Bruck | 308/9 |
| 3,812,654 | 5/1974 | Brown | 184/6 |

*Primary Examiner*—Richard C. Pinkham
*Assistant Examiner*—Marvin Siskind
*Attorney, Agent, or Firm*—Wm. Griffith Edwards

[57] ABSTRACT

A bearing arrangement and lubricant supply system for rotating machines, illustrated as embodied in a vacuum pump of the liquid vortex type comprises a stationary hollow shaft on which is mounted the rotor of the pump. The rotor includes a hollow shaft concentrically mounted about the stationary shaft on bearings near the ends thereof. Oil under pressure is supplied to the interior of the stationary shaft and from there to the annular space between the shafts. The stationary shaft is provided with inlet and discharge portions and the oil from the annular space is discharged through the discharge portion. The high pressure is maintained within the bearing spacer and throughout the spacer with the shafts. The rotor in effect floats on the lubricant and the volume of oil under pressure acts somewhat as a shock absorber and minimizes shock or unbalance occurring during operation of the pump.

10 Claims, 12 Drawing Figures

MOUNTING AND LUBRICATING SYSTEM FOR ROTATING MACHINERY

This application is a continuation-in-part of my co-pending application Ser. No. 472,651 filed May 23, 1974 and now abandoned, which is a division of my application Ser. No. 231,148 filed Mar. 21, 1972, and issued on May 28, 1974, as U.S. Pat. No. 3,812,654.

My invention relates to rotating machinery and particularly to an improved rotor mounting and lubricating system for such machinery.

The rotor of machinery such, for example, as the liquid vortex vacuum pump disclosed and claimed in my above identified patent and that in my prior U.S. Pat. No. 3,204,861 issued Sept. 5, 1965, is subject to varying loads and to shocks or unbalance disturbancy during operation. It is desirable to minimize vibration and unbalanced operation during operation of the rotor of such equipment and, accordingly, it is an object of my invention to provide an improved mounting arrangement for pump rotor and the like.

It is another object of my invention to provide a rotor mounting for heavy equipment including an improved arrangement for minimizing vibration or unbalance during operation thereof.

It is a further object of my invention to provide a vacuum pump of the liquid vortex type including an improved arrangement for minimizing vibration during operation.

Briefly, in carrying out the objects of my invention, in one embodiment thereof, a liquid vortex vacuum pump of the general type disclosed in my above patents is provided with a helical rotor mounted for rotation in a cylindrical shroud. The shroud is positioned in a closed tank below the level of water contained therein. The gas to be purified and a spray of water or other treating liquid mixed with the gas are admitted to the chamber about the first helical element. The two elements are spaced from one another, the second element being the liquid vortex forming rotor. The gaseous fluid is compressed and driven into the liquid vortex where a violent mixing action of gas and liquid under high pressure takes place and substantially all of the particular matter is transferred from the gas to the liquid and remains in the water in the tank. Some of the constituents of the gas are also absorbed by or dissolved in the water and remain in the tank. The operation of the pump under various load conditions may tend to cause undesirable vibration due to unbalanced forces. The pump rotor is mounted on a tubular shaft provided with a bearing and pressure lubricating arrangement whereby the rotor "floats" on high pressure oil substantially throughout its length; this arrangement stabilizes the rotor of the pump which operates smoothly with minimum vibration regardless of the actual mechanical balance of the rotor.

The features of novelty which characterize my invention are pointed out with particularity in the claims annexed to and forming a part of this specification. The invention itself however both as to its organization and manner of operation together with further objects and advantages thereof will be best understood by reference to the following description taken in connection with the accompanying drawings in which:

Figure 1:
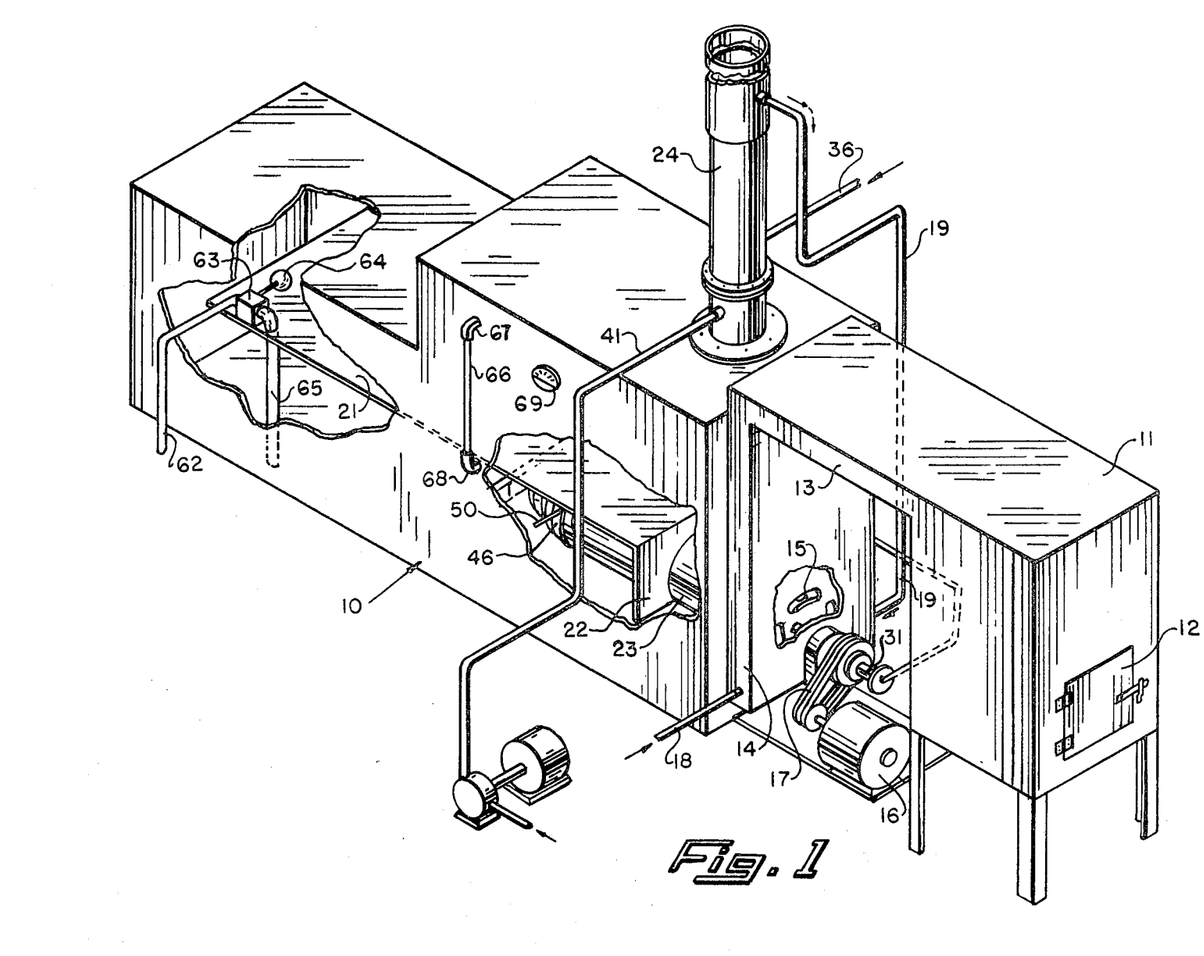
FIG. 1 is an isometric view partly broken away illustrating a vortex pump embodying my invention arranged to treat gases delivered from an incinerator.

Referring now to the drawings the apparatus illustrated in FIG. 1 comprises a vortex pump unit 10 arranged to receive the combustion gases from an incinerator 11, the bottom wall of which is a grating to admit air while supporting the material being burned. The material to be burned is charged into the incinerator through a door 12 and the smoke and fumes are removed from the incinerator through a horizontal duct 13 and a vertical duct 14 which is in communication with the intake of the vacuum pump through a plurality of openings in the pump tank or housing one of which is illustrated at 15. The pump is driven by an electric motor 16 through V-belts 17 and water or treating fluid is supplied to the pump intake through conduits 18 and 19.

During operation the pump produces a vacuum on its intake side and the combustion gases are drawn into the pump where they are mixed with water supplied in a spray, the tank being filled with water to a level sufficient to submerge the pump. A horizontal baffle 21 may be mounted in the tank between the walls and above the pump and terminates in a vertical portion 22 which fits closely about the shroud on the pump indicated at 23. Thus fluids circulated by the pump are moved toward the far end of the tank where they pass around the baffle, gaseous constituents being collected above the water level in the tank. The operation of the pump is such that particulate matter in the combustion gases is mixed with the water and remains in the water where it settles toward the bottom or collects on the surface depending upon the characteristics of the material, its specific gravity and any tendency it may have to agglomerate. The gases discharged above the water level in the pump tank together with any remaining fine particulate matter are delivered to a stack 24 in which may be arranged further purifying equipment such as charcoal briquettes maintained in water or a treating solution through which the gas is passed.

Figure 2:
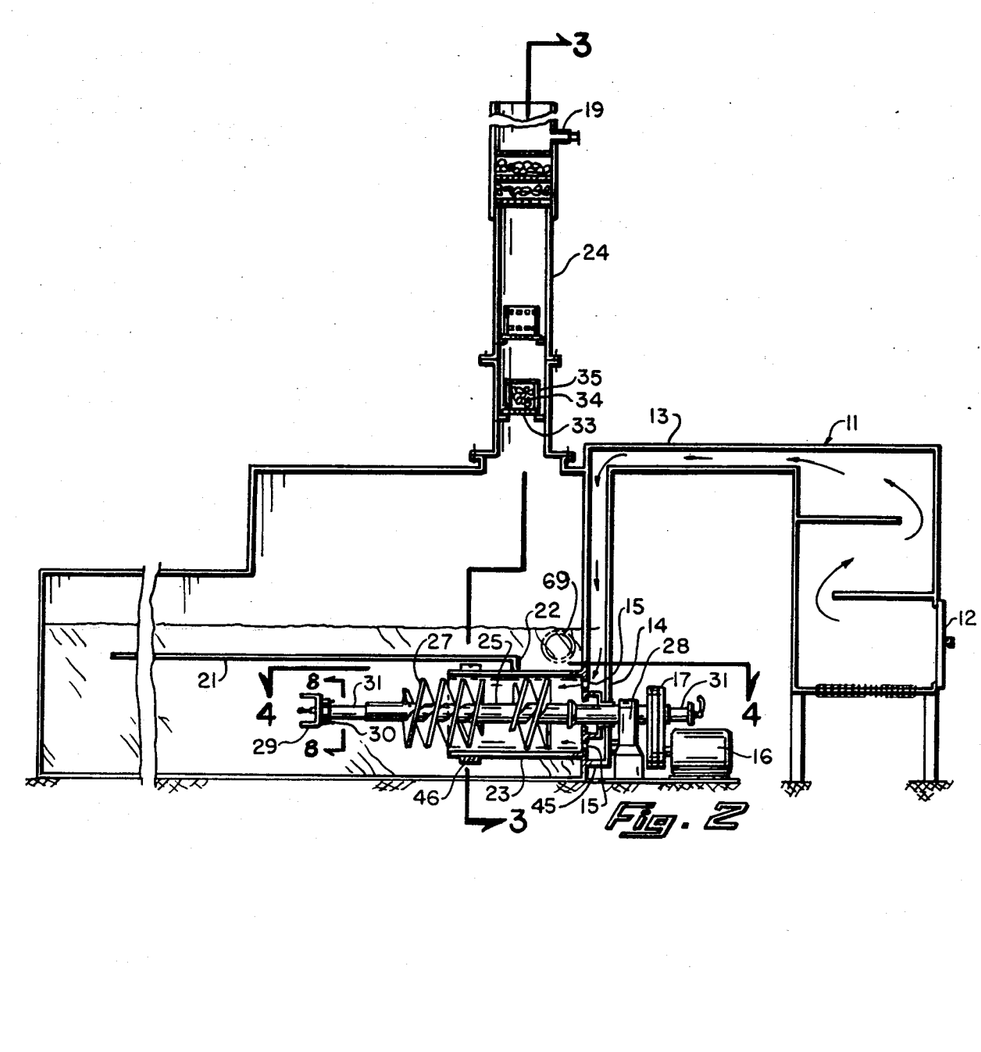
FIG. 2 is a longitudinal sectional view of the apparatus of FIG. 1.
Figure 3:
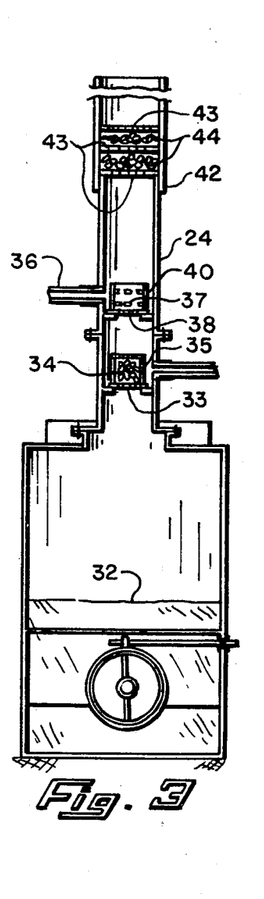
FIG. 3 is a sectional view taken along the line 3—3 of FIG. 2.

The pump illustrated in FIG. 2 comprises a helical drive rotor mounted on a shaft 25 which is rotated by the motor 16 through the V-belts 17. The rotor includes a double helix portion 26 arranged within the intake zone of the pump and a vortex forming compression portion 27 arranged partly within the shroud 23 and partly axially outside the shroud. The rotor is supported between a mounting and thrust bearing 28 and a stationary channel iron support 29 which carries a stationary hollow shaft 31 secured to the support by a threaded nut 30; the shaft 25 extends beyond the bearing 28 and carries the sheave for the belts 17 and the stationary shaft 31 extends still farther beyond the right end of the assembly. The rotor 27 is also of double helical construction providing in effect two rotors spaced 180° from one another and each having a relatively long pitch. During operation of the vortex pump, a low pressure or vacuum is created in the right-hand or intake zone of the pump within the shroud 23 and a liquid vortex is formed within the rotor 27 which compresses the gases driven toward it by the rotor 26 and drives them into the liquid within the tank of the vortex pump unit 10. The level of the liquid in this tank may be maintained as desired but is such as to completely submerge the vortex pump and maintain a liquid level above the baffle 21 such as indicated at 32. The web of the channel iron support 29 is provided with elongated openings 29' on either side of the center to afford passage for the liquid stream from the pump.

The compressing action of the liquid vortex pump section produces a violent circulation of liquid in the tank and raises the vapor or gaseous pressure in the tank, a substantial quantity of the gases being dissolved or absorbed in the liquid, and the remaining vapors being discharged through the stack 24. A positive gas pressure substantially higher than atmospheric is maintained within the tank due to the fluid resistance within the stack 24 and may be further controlled by employing a weighted regulator valve of the flapper type as described hereinafter.

A substantial quantity of the gas driven into and absorbed or dissolved in the water in the tank is maintained in the water for a predetermined period because of the pressure maintained in the tank. The violent action of the vortex together with the agitation within the tank results in removing major quantities of particulate matter and various gases contained within the gas stream discharged from the incinerator 11 to the pump. The gases rising through the stack 24 are treated to remove any remaining particulate matter and undesired gaseous constituents. A column of water is maintained in the stack 24 to a level determined by the position of the outlet 19. During operation of the pump, gas is continuously delivered to the stack through a screen 33 which may be a copper plate provided with a multitude of holes and on which may be supported a body of charcoal briquettes, porcelain bodies or other chunks or pieces of material as indicated at 34, and which are contained within an open top cylinder 35. The chemical treating agent in the water solution which, for example, may be lime water for neutralizing acids, may be admitted to the tower through an intake 36 and flows upwardly around the cylinder 35 and thence over the top thereof and further moves on up through the stack 24 through a set of screens 37 supported on a foraminous copper plate 38, the screens being mounted within an open cylindrical tube 40 mounted on the plates 38 and extending above a fresh water inlet 41. The first section of the stack terminates in a section 42 which carries three screens or foraminous plates 43 between the middle plate and top plate of which are arranged stacks of charcoal briquettes 44. The heights of a stack above the portion 42 is determined by the nature of the operation and the pressure balance desired within the system.

During the operation of the vortex pump system, the stack 24 is maintained filled with liquid between the screen 33 and the outlet 19 and the gas moves upwardly in a steady stream through this liquid in separate bodies or bubbles and is treated by the chemical content of the liquid as well as by passage over the copper screens and the charcoal briquettes. Overflow liquid from the outlet 19 is returned to the intake of the pump through the outlet 19 conduit which is connected to deliver the liquid to an annular manifold 45 at the intake of the pump.

Figure 4:
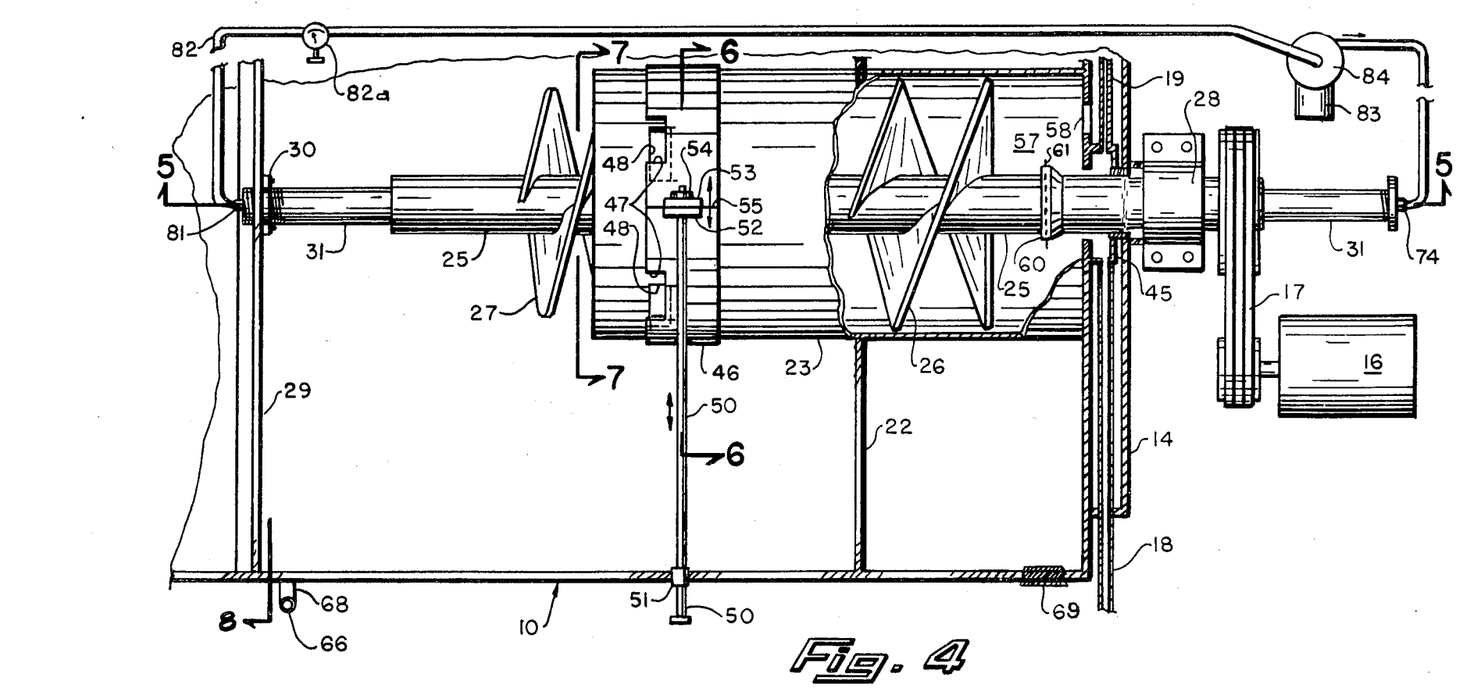
FIG. 4 is an enlarged top plan view partly in section and partly broken away illustrating the vortex pump construction.

The intensity of the vortex action of the pump may be adjusted by moving a band 46 arranged about the shroud 23 adjacent vortex impeller 27. As shown in FIG. 4, the band 46 is provided with lateral notches 47 which may be moved to selected positions over intake openings 48 in the shroud 23. The band may be rotated by forward or reverse pressure applied by a rod 50 extending tangentially of the band 46 and through the wall of the tank 10, a gland or seal 51 being provided to afford the sliding movement of the rod without leakage of liquid from the tank. The rod is attached to the band 46 in any suitable manner, such as by upturned flanges 52 and 53 formed on the band and having holes for passage of the rod and a nut 54 for securing the rod to the flanges while affording limited movement of the rod upon rotation of the band 46. Water from the tank 10 is recirculated to the interior of the shroud through the openings 48 and varies the intensity or mode of operation of the vortex in the manner described and claimed in my above identified U.S. Pat. No. 3,204,861.

As illustrated in FIG. 4, the hot products of combustion delivered to the vortex pump unit through the vertical duct 14 enter the intake zone of the vacuum pump indicated at 57 through a plurality of openings 58 in the end plate of the tank 10. The annular manifold 45 is also welded or otherwise suitably secured and bonded to the end plate of the tank and the water entering this annular manifold through the pipes 18 and 19 goes outwardly about the shaft 25 of the rotor through an annular clearance about the rotor. This produces a high velocity jet of water which is delivered against a slinger ring 60 which is provided with teeth 61 to further break up the water into small drops or particles. The gaseous matter and water mixed in the chamber 57 are driven by operation of the rotor 26 toward the rotor 27 and the vortex formed thereby and are compressed and thoroughly mixed with the water of the vortex and then discharged at the left-hand end of the shroud 23. The effect of the operation of the impeller 27 and the vortex action is to compress the gaseous components of the products of combustion and mix them thoroughly with the water within the vortex. This gas and liquid mixture under the pressure maintained within the tank 10 is agitated and soluble or otherwise absorbable constituents of the gaseous material are added to the water and thereby removed from the gaseous stream. Particulate matter in a similar manner is thoroughly mixed with the water and on flowing out of the shroud 23 circulates in the water and separates by gravity, some of the material floating and other material sinking. The accumulation of solid matter within the tank 17 depends upon the nature of the products of combustion delivered to the vortex pump and depending upon these materials, may sink quickly to the bottom or may be of a nature which tends to float to the top where it may agglomerate and can be removed by skimming off the agglomerated masses. An access opening having a removable cover such as indicated at 61 in FIGS. 2 and 4 may be provided to remove floating debris from the surface of the water. A drain plug, valve or clean-out door (not shown) is also provided at the bottom of the tank for affording removal of sludge and waste collected on the bottom of the tank.

The level of the liquid in the tank 19 is maintained by the discharge of liquid through an outlet conduit 62, controlled by a valve 63 actuated by float 64, the discharged water and solid matter therein entering from a point below the surface near the bottom of the tank as indicated by the lower end of an intake pipe 65 leading to the valve. For external observation of the level of the liquid, a gauge glass 66 may be provided on the side of the tank, it being connected to the interior of the tank through upper and lower elbows 67 and 68, respectively. A pressure gauge 69 is also provided to indicate the gas pressure above the water in the tank.

Figure 5:
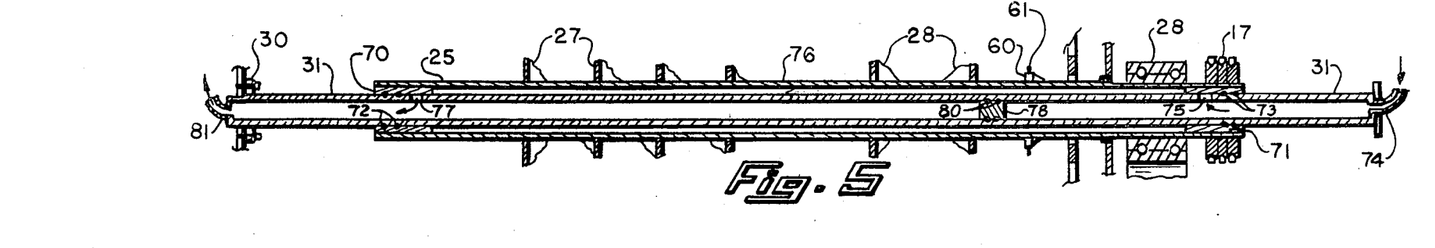
FIG. 5 is a longitudinal section view taken along the line 5—5 of FIG. 5.

As shown in the sectional view FIG. 5, the hollow shaft 25 of the rotor is mounted on the stationary tubular shaft 31 on sleeve bearings 70 and 71, a seal being provided between the bearings and the shaft 31 by pairs of O-rings 72 for the bearing 70 and 73 for the bearing 71. Oil for lubricating the bearings is admitted to the interior of the shaft 31 through an intake fitting 74 and flows from the interior of the fitting through an oil passage 75 into the space between the bearing 71 and the shaft 31, this space being of the order of 0.007 of an inch and affording a circulation of the oil between the bearing and the shaft. The oil then flows through an annular space between the two shafts, as indicated at 76, and flows out through a passage 77 after passing through the space between the bearing 70 and the shaft 31. Direct flow of oil through the center of the shaft 31 is prevented by a plug 78 secured by a suitable set screw (not shown) to the tube 31 and sealed by a pair of O-rings 80. The oil leaves the center of the shaft 31 through an outlet fitting 81 and is returned to the opposite end of the shaft 31 through a line or conduit 82, an oil reservoir 83, by operation of a pump 84 which circulates the oil under sufficient pressure to force it through the bearing spaces and to maintain the oil within the inner tube 31 at relatively high pressure as well as the oil filling the annular space 76 between the shaft 25 and the stationary shaft 31. The oil pressure is controlled by an adjustable needle valve 82a in the line 82.

The mounting of the shaft to provide the complete filling of the spaces between the stationary and rotatable shaft with oil under pressure and to maintain the pressure within the clearance within the bearings 75 and 77 at the ends of the rotating shaft effects a floating mounting of the rotating shaft and this mounting cushions the shaft and rotors against shock and vibration during operation. It has been found that during operation of a rotor such as illustrated in the drawings that even though the rotor is out of balance it operates smoothly with a minimum vibration of the equipment. The pump operates smoothly under all loads and precision balancing of the rotor has been found to be unnecessary. It appears from the operation of a rotor constructed in the manner illustrated in FIG. 5 that even with the long distance of shaft suspension between the mounting bearings that quick action and distortion of the rotation of the helical members is dampened to a degree that it becomes unnoticeable in the operation of the machine. By way of illustration and not by way of limitation, it has been found that in a system constructed as illustrated in the drawings, lubricating oil at a pressure of 125 pounds per square inch delivered to the shaft 31 provided effective lubrication and damping and minimizes the effects of off-balance masses on the rotor.

Figure 6:
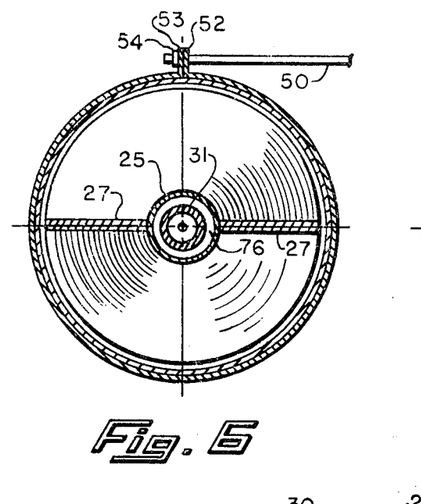
FIG. 6 is a sectional view taken along the line 6—6 of FIG. 4.
Figure 7:
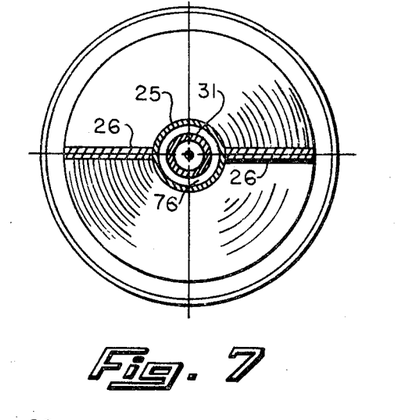
FIG. 7 is a sectional view taken along the line 7—7 of FIG. 4.
Figure 8:
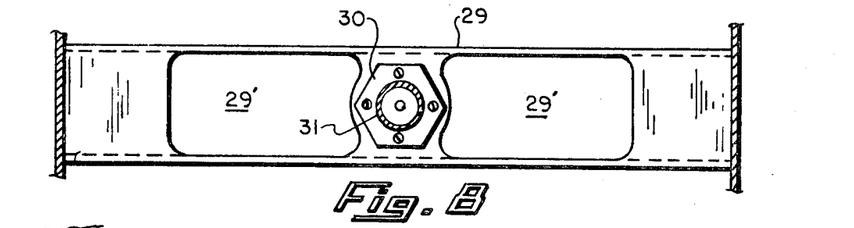
FIG. 8 is an enlarged longitudinal view of a rotor support of the pump of FIG. 1.

The rotors 26 and 27 as shown in FIGS. 7 and 6, respectively, each comprises double helices arranged at 180° from one another. In this way, they employ a longer pitch for each helix with a spacing of one-half the pitch distance between adjacent turns of the two helical elements. This double helix arrangement facilitates good balance of the rotors and also provides balanced action on the fluids circulated by the rotors.

Figure 9:
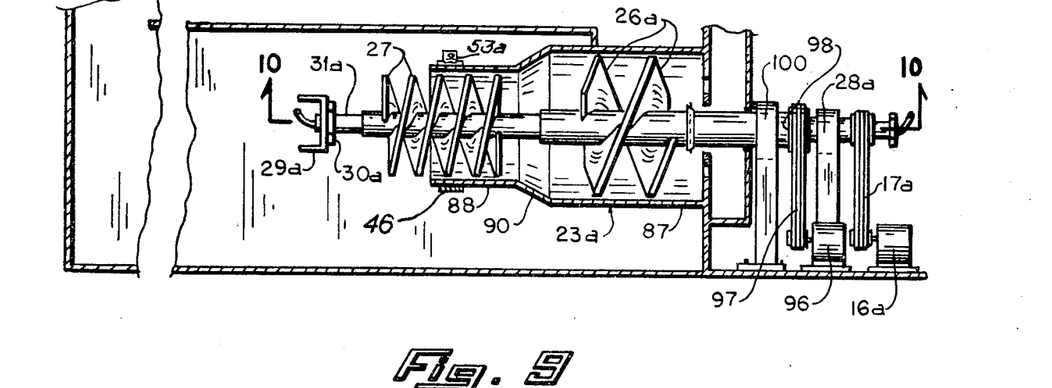
FIG. 9 is a longitudinal section view illustrating another embodiment of my invention.

The pump rotor assembly indicated in FIG. 9 is similar to that of FIG. 1 and corresponding parts have been designated by the same numerals with the suffix letter a. The construction of FIG. 9 differs from that of FIG. 1 in that the shroud 23a is formed to provide a large diameter intake chamber section 87 a smaller diameter vortex helix section 88, the two sections of the shroud being cylindrical and being connected by a conical wall member 90.

Figure 10:
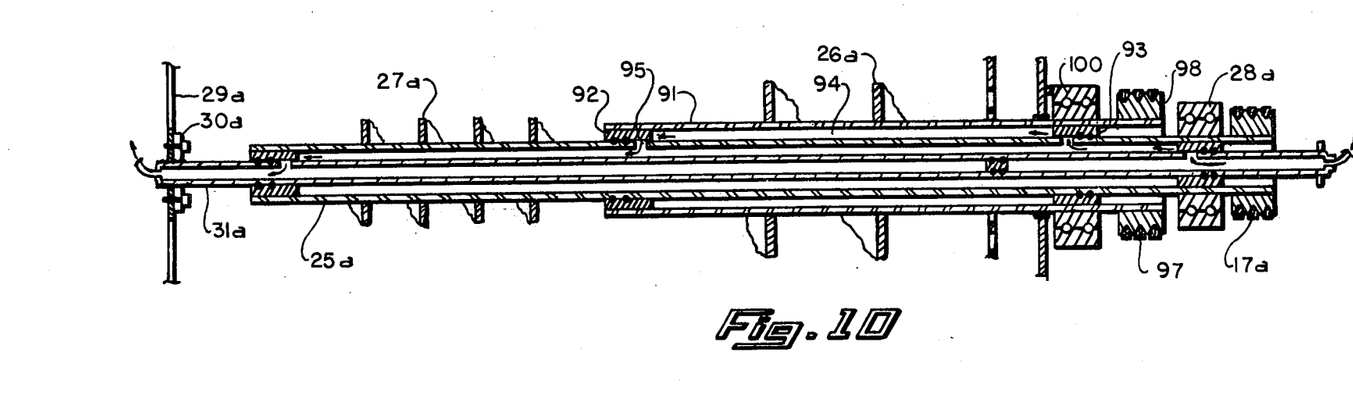
FIG. 10 is a longitudinal section taken along the line 10—10 of FIG. 9.

The construction illustrated in FIGS. 9 and 10 further differs from that of the first embodiment in that the rotor elements 26a are mounted on an independent shaft 91 which rotates about the shaft 25a on bearings 92 and 93. Oil from the annular space 76a between the shafts 25a and 31a is admitted to an annular space 94 between the hollow shaft 91 and the hollow shaft 25a through an inlet 95 so that this space is filled with lubricating oil which flows into the inner spaces between the bearings 92 and 93 and the tube 25a. The shaft 91 is driven by a separate motor 96 which drives the shaft through V-belts 97 engaging a sheave or pulley 98. The shaft 91 is mounted in a thrust bearing 100.

The motors 16a and 96 may be arranged to be driven at different speeds so that an additional arrangement is provided for controlling the operation of the pump rotor. The relative sizes of the portions 87 and 88 of the shroud 23a are selected according to the application for which they are intended and for some applications, both in the first embodiment and in the embodiment of FIG. 9, it may be found desirable to provide a shroud wherein the shroud section of the intake chamber is of smaller diameter than the shroud section for the liquid vortex chamber.

Figure 11:
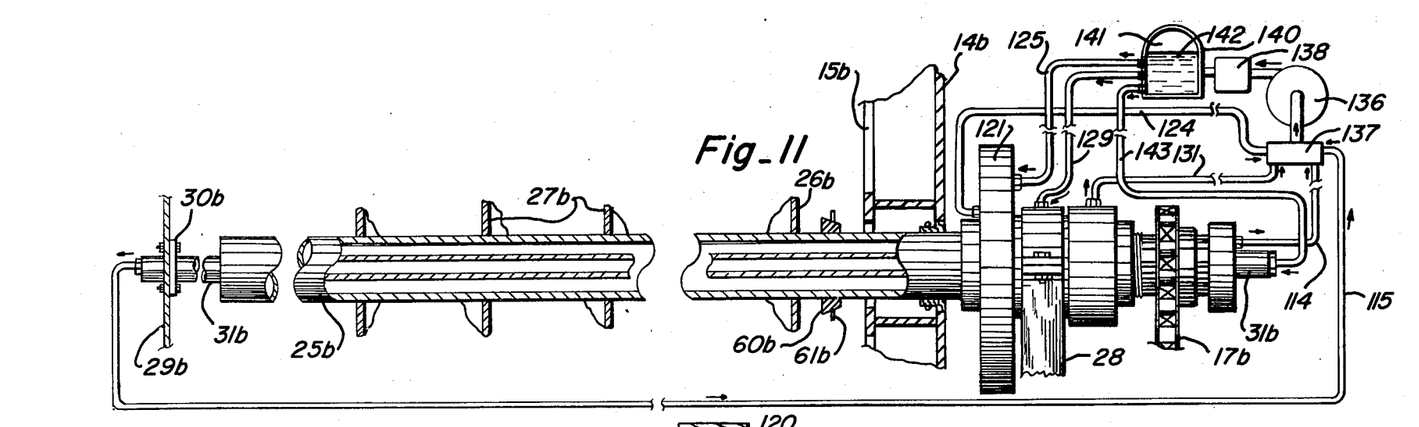
FIG. 11 is a sectional view similar to FIG. 10 illustrating a further embodiment of my invention; and, FIG. 12 is an enlarged sectional view of a portion of the device of FIG. 11.
Figure 12:
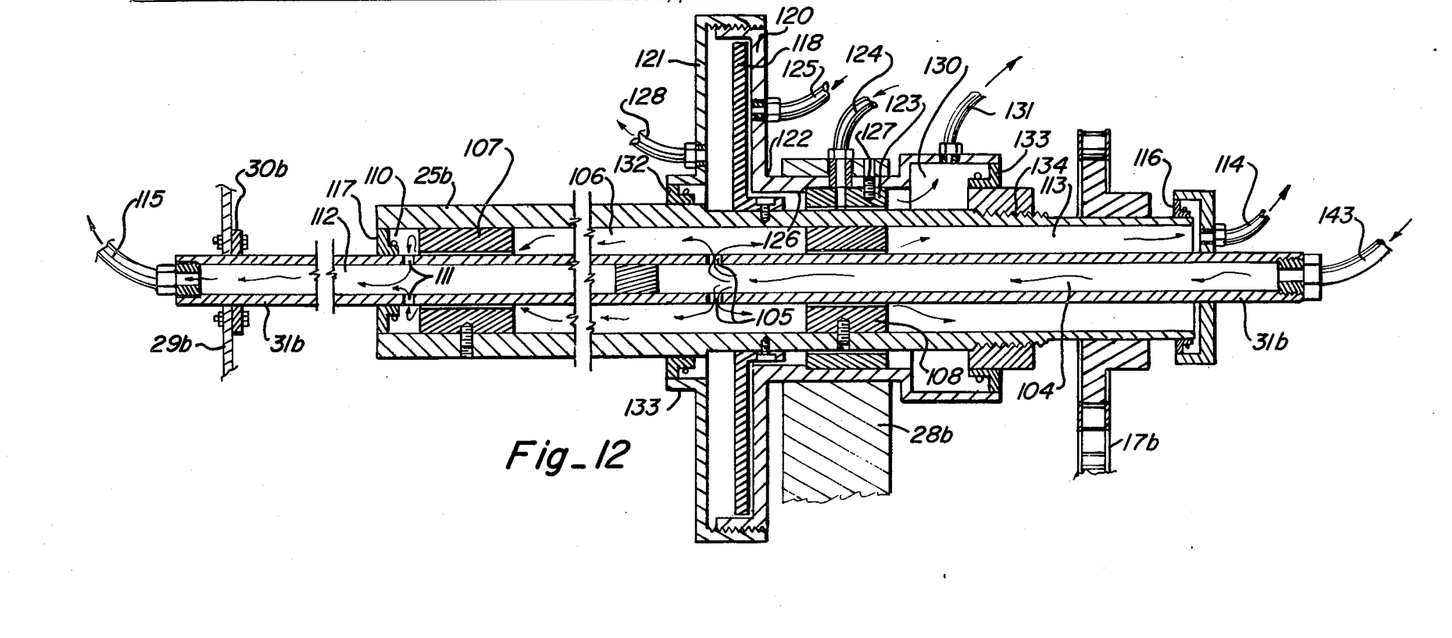

Referring now to FIGS. 11 and 12 the modification of my invention shown herein is similar in many respects to that illustrated in FIGS. 5 and 10 and corresponding parts have been designated by the same numerals with the suffix letter b. The construction of FIGS. 11 and 12 differs from that of FIG. 5 in that lubricating oil under pressure flowing into the interior of the hollow shaft 31b is delivered from an inlet chamber 104 through ports 105 to a central annular chamber 106 between bearings 107 and 108 mounted within the hollow shaft 25b and spaced from the exterior surface of the shaft 31b by a clearance which may be of the order of 0.002 inch for each inch of the outside diameter of the shaft 31b. Thus for a 3½ inch shaft, the total clearance would be 0.007 inch or 0.0035 clearance between the bearing and the stationary shaft during operation. Oil under pressure flows through the clearance in the bearing 107 to a discharge chamber 110 and out through ports 111 into an outlet chamber 112 in the shaft 31b. Oil is also discharged through the clearance of the bearing 108 to an annular outlet chamber 113 and is returned to the pressure system through a high pressure conduit 114, the oil from the chamber 112 being returned to the high pressure system through a conduit 115. The inlet and outlet passages in the shaft 25b between that shaft and the shaft 31b are sealed by suitable rotating seals 116 and 117.

Thus instead of passing in series through the clearance space of the first bearing into the annular chamber and out through the clearance space of the second bearing as in FIG. 5, the oil under pressure in the present modification enters a central chamber and passes outwardly through both bearings, the seals being located at the ends of the chamber rather than at the bearings.

In addition to the different arrangement for circulation of the oil under pressure the present embodiment includes a thrust bearing comprising a rigid disc 118 arranged to rotate adjacent a complementary wall 120 forming a portion of a housing including wall portions 121 and 122, the wall 120 being part of the portion 122. The housing is generally cylindrical in configuration and provided with a bearing 123 for rotation about the shaft 25b. Oil under pressure is maintained within the thrust bearing housing and enters through a first conduit 124 to provide lubrication for the bearing 123 and a second conduit 125 which supplies oil to the opposing bearing faces of the disc 118 and wall 120. The bearing 123 is maintained in position against an annular shoulder 126 within the housing portion 122 and is held securely in position by a set screw 127.

The oil under pressure flows from the conduits 124 and 125 and maintains the entire housing filled with oil under pressure and maintains a supply of oil between the thrust bearing faces, the oil flowing outwardly from the thrust bearing around the top edge of the disc 118 and into the left-hand side of the chamber within the housing portion 121 from which it is discharged through a conduit 128 and returned to the oil pressurizing system. The oil from the conduit 124 flows through the bearing clearances and may be discharged through a chamber 130 and a return conduit 131. The housing is sealed about the shaft 25b by a rotary seal including a flexible element 132 engaging the inner face of a flange 133 on the inner side of the portion 121 and a seal 133' mounted on a collar 134 threadedly secured to the shaft 25b, the seal being in running engagement with the inner righthand end of the housing portion 122. Oil from between the thrust bearing 118 and wall 120 may flow either outwardly or inwardly depending upon the relative pressures prevailing at any one time of operation and is maintained continuously under pressure during operation of the system so that this oil in the event of variations in thrust pressure acts as a shock absorbing plate.

The housing portions 121 and 122 are threadedly attached to one another so that they may be separated for access to the plate or disc 118.

The oil pressure supply system is indicated diagrammatically in FIG. 11 and comprises a high pressure positive displacement pump 136 arranged to receive lubricant from an intake manifold 137 and deliver it to a filter 138 from which it flows into an accumulator 140; the accumulating may be of the diaphragm type having a body of gas 141 above a diaphragm indicated at 142. Suitable safety features may be provided such, for example, as a pressure relief bypass for allowing oil to pass around the filter 138 should the filter become plugged. Oil is supplied under pressure through a conduit 143 to the chamber 104 of the hollow shaft 31b and through the conduits 124 and 125 to the inlets for the thrust bearing assembly. The conduits 114, 115, 128 and 131 all return oil to the manifold 137 for recirculation by the pump 136. The accumulator 140 acts to assure a steady flow of the high pressure lubricant and prevents hammering in the system.

During the operation of the several embodiments of my high pressure lubricating system, sudden variations of load which may be caused by sudden changes in the characteristics of the fluids handled by the pump or damp and vibrations of the pump resulting therefrom are minimized. This system is particularly advantageous in the mounting of heavy equipment, the rotors of which may have weights of the order of several tons and it makes possible the continuous operation of the rotor smoothly and with minimum vibration.

While I have described my invention in connection with a particular type of pump, other types of heavy equipment including heavy rotating members may be mounted in the same manner. Various modifications and other applications will occur to those skilled in the art, and I do not desire my invention to be limited to the details of the system disclosed and I intend, by the appended claims, to cover all modifications which fall within the spirit and scope of my invention.

I claim:

1. A mounting and lubricating system for rotating machinery comprising:

a stationary shaft having separate lubricant supply passages therein extending from the ends thereof;

a rotor having a hollow shaft mounted on said stationary shaft, the mounting of said rotor comprising bearings adjacent the ends of said hollow shaft for carrying said rotor for rotation about said stationary shaft;

seals adjacent said bearings and the ends of said hollow shaft for preventing the passage of lubricant to the outside;

lubricant passages extending through the wall of said stationary shaft communicating with respective ones of said supply passages for affording a flow of lubricant through the clearance space of said bearings;

means for supplying lubricant under pressure to the supply passage at one end of said stationary shaft whereby the lubricant flows through one of said bearings into the annular space between said shafts thence through the other bearing and its discharge opening to the other end supply passage of said stationary shaft and back to the supply means whereby the space between said shafts is maintained filled with lubricant under pressure and vibrations of said rotor are damped during operation thereof.

2. A mounting and lubricating system for rotating machinery comprising:

a. a stationary shaft;

b. a hollow shaft concentric with said stationary shaft and rotatably mounted thereon and providing a longitudinally extending annular space between the shafts;

c. said mounting including bearings near the ends of said hollow shaft;

d. seals arranged between said shafts for preventing the loss of lubricant from said annular space;

e. means for supplying liquid lubricant under pressure to the annular space between said shafts and to said bearings for maintaining said space filled with lubricant under pressure, said lubricant acting to damp vibrations of said hollow shaft during rotation thereof, and said system including a second hollow shaft carrying a second rotor and mounted for rotation about said first hollow shaft and providing a second annular space between said hollow shafts, means for supplying lubricant to said second space and for filling said second space and maintaining the lubricant under pressure whereby the lubricant acts to damp vibrations of said second hollow shaft.

3. A mounting and lubricating system for rotating machinery comprising:
   a. a stationary shaft;
   b. a hollow shaft concentric with said stationary shaft and rotatably mounted thereon and providing a longitudinally extending annular space between the shafts;
   c. said mounting including bearings near the ends of said hollow shaft;
   d. seals arranged between said shafts for preventing the loss of lubricant from said annular space;
   e. means for supplying liquid lubricant under pressure to the annular space between said shafts and to said bearings for maintaining said space filled with lubricant under pressure, said lubricant acting to damp vibrations of said hollow shaft during rotation thereof, and
   said stationary shaft being hollow and said lubricant under pressure being supplied first to the interior of said stationary shaft and thence to said annular space.

4. A mounting and lubricating system as set forth in claim 3 wherein the interior of said stationary shaft is divided to provide an inlet chamber and an outlet chamber and lubricant from said annular space is discharged therefrom through the outlet chamber.

5. A mounting and lubricating system as set forth in claim 4 wherein said bearings are sleeve bearings and divide the said annular space to provide discharge chambers at both ends thereof connected to a main control chamber by the bearing clearance spaces constituting restrictions in the flow path of lubricant, the lubricant flowing from said inlet chamber being directed into said central chamber, and said seals being positioned between said discharge chambers and the exterior of said shafts.

6. A mounting and lubricating system for rotating machinery comprising
   a. a stationary shaft;
   b. a hollow shaft concentric with said stationary shaft and rotatably mounted thereon and providing a longitudinally extending annular space between the shafts;
   c. said mounting including bearings near the ends of said hollow shaft;
   d. seals arranged between said shafts for preventing the loss of lubricant from said annular space;
   e. means for supplying liquid lubricant under pressure to the annular space between said shafts and to said bearings for maintaining said space filled with lubricant under pressure, said lubricant acting to damp vibrations of said hollow shaft during rotation thereof, and
   f. a thrust bearing having a stationary member mounted about said hollow shaft and a rotatable member secured to said hollow shaft and rotatable therewith in thrust transmitting relationship to said stationary member.

7. A mounting and lubricating system as set forth in claim 6 wherein said stationary member comprises a housing having a flat wall extending normal to the axis of said hollow shaft and said rotatable member comprises a flat disc spaced from and parallel to said flat wall, and means for maintaining liquid lubricant filling said housing whereby the lubricant between said disc and said wall acts to transmit longitudinal forces from said rotatable member to said housing.

8. A mounting and lubricating system as set forth in claim 7 including means for delivering lubricant under pressure to the space between said members and for affording a flow of lubricant about the periphery of said disc into the housing on the opposite side of said disc and for discharging lubricant from said housing.

9. A mounting and lubricating system as set forth in claim 8 wherein said lubricant supply means includes a common lubricant pumping and cleaning system for effecting the circulation of lubricant through said annular space and through said housing.

10. A mounting and lubricating system as set forth in claim 8 including a sleeve bearing for affording relative rotation of said housing and said hollow shaft, and means for delivering lubricant under pressure to the clearance space of said sleeve bearing, said housing having a first lubricant discharge connection thereof on said opposite side of said disc and a second lubricant discharge connection on the side of said bearing remote from said disc whereby lubricant may flow between said bearing and said disc in either direction.

* * * * *